Oct. 18, 1960  J. H. REIGHART  2,956,552
WATER-COOLED STEEL SKEWBACK CHANNEL FOR FURNACE ROOF
Filed March 5, 1959
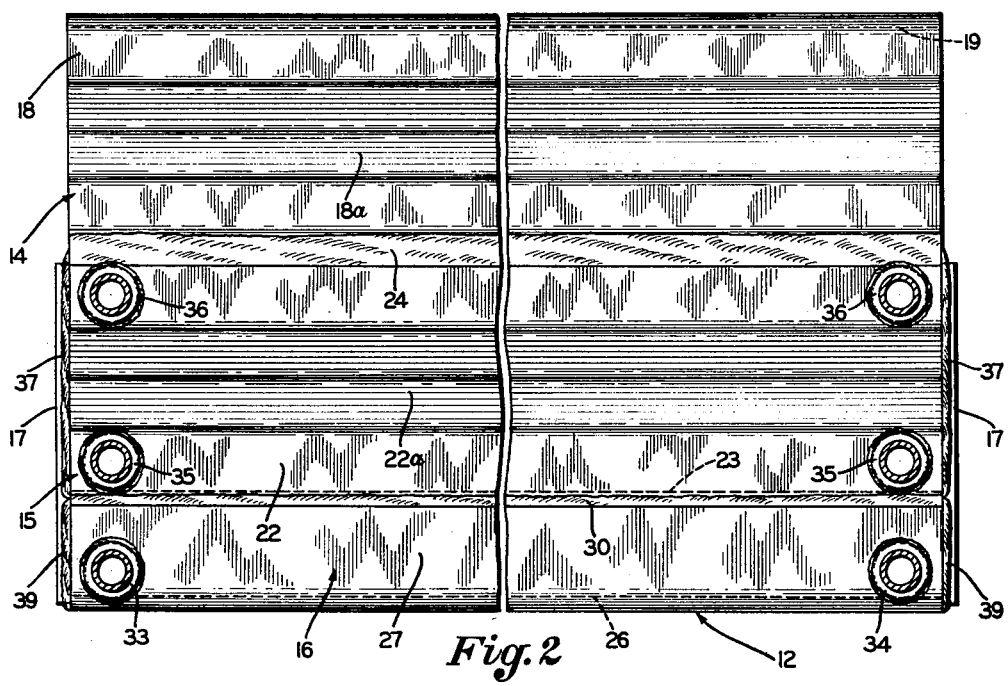
Fig. 2
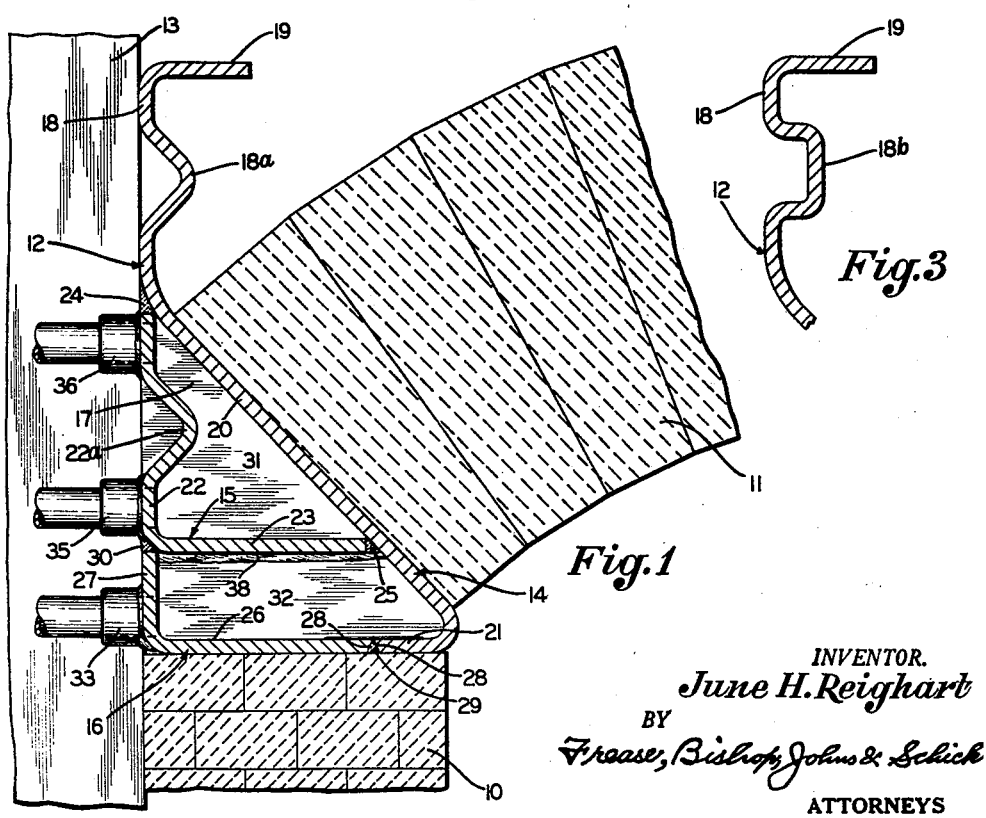
Fig. 3
Fig. 1
INVENTOR.
June H. Reighart
BY
Frease, Bishop, Johns & Schick
ATTORNEYS United States Patent Office 2,956,552
Patented Oct. 18, 1960

2,956,552

WATER-COOLED STEEL SKEWBACK CHANNEL FOR FURNACE ROOF

June H. Reighart, 1991 Lee Road, Cleveland 18, Ohio

Filed Mar. 5, 1959, Ser. No. 797,403

3 Claims. (Cl. 122—6)

The invention relates to skewback channels for a furnace roof or arch, and more particularly to a fabricated hollow steel skewback channel with means for circulating cooling water therethrough, and the present application is a continuation-in-part of my copending application, Serial No. 681,725, filed September 3, 1957.

Under present practice, the arched roof of a furnace is supported at each side upon a refractory skewback block mounted upon the top of the adjacent side wall of the furnace and supported in a steel channel.

Although it is common practice to locate cooling water pipes between the bottom of the refractory skewback block and the top of the furnace side wall, it is not possible to cool the refractory block sufficiently to prevent rapid deterioration thereof by the extreme heat of the furnace. As a result, the refractory skewback blocks become so badly burned away that they must be replaced after a very few heats of the furnace. This is obviously an expensive operation and furthermore the furnace must remain shut down during such repairs, thus considerably reducing the output of the furnace and increasing production costs.

Furthermore, the conventional cooling means for such refractory skewback blocks has little or no cooling effect upon the adjacent portions of the furnace roof, resulting in rapid burning out of the brickwork in the roof arch, which in turn requires additional shut-down time of the furnace for roof repairs, thus further reducing the output of the furnace and increasing production costs.

Also, the combined load of the roof and the high temperature of the furnace tend to cause "sway-backing" in the skewback channel.

It is, therefore, an object of the present invention to provide a water-cooled steel skewback channel which overcomes the above-recited objections and disadvantages.

Another object of the invention is to provide a fabricated, hollow steel skewback channel, the entire interior of which comprises water chambers through which cooling water may be continuously circulated to not only cool the skewback channel, but also to maintain the adjacent portions of the furnace roof and side wall considerably cooler than in conventional practice.

A further object of the invention is to provide such a skewback channel formed of steel plates, preformed and welded together to form a hollow skewback channel having water-tight cooling chambers therein.

A still further object of the invention is to provide a skewback channel of the character referred to, in which the preformed metal plates are so welded together that no weld therein is exposed to the direct furnace heat, thus avoiding the danger of leakage.

Another object of the invention is to provide a steel skewback channel of the character referred to in which two horizontal corrugations are formed in the web member or vertical outer wall of the skewback channel to strengthen the same against "sway-backing" from the combined load of the roof and the temperature of the furnace.

The above objects together with others which will be apparent from the drawings and following description, or which may be later referred to, may be attained by constructing the improved water-cooled skewback channel in the manner illustrated in the accompanying drawings and hereinafter described in detail.

The invention may be briefly described in general terms as comprising a hollow steel skewback channel member having a vertical outer wall with an inturned flange at its upper end, a flat bottom wall and a downwardly and inwardly inclined inner wall extending from a point spaced from the top of the outer wall to the inner end of the bottom wall, and forming a hollow triangular enclosure divided by a horizontal partition wall into two cooling chambers with means for circulating cooling water through each chamber.

The skewback channel may be formed of three preformed steel plates welded together and comprises a first member having a vertical upper portion with a horizontal inturned flange at its upper end, a horizontal corrugation therebelow terminating at points spaced from opposite sides of said member, a downwardly and inwardly inclined portion with an out-turned horizontal flange at its lower end; a second member of L-shape having a vertical portion with a horizontal corrugation coextensive therewith, and an inturned horizontal portion at its lower end; and a third member of reclining L-shape having a relatively long horizontal portion with a relatively short vertical portion at its outer end. End plates or heads of triangular shape are welded to the opposite ends of the channel to form water-tight chambers therein.

In constructing the improved skewback channel, the first and second members are first secured together by welding. To accomplish this operation the second member is positioned relative to the first member so that the vertical portions of the two members are in alignment and the inner end of the horizontal portion thereof is in contact with the inclined portion of the first member at a point spaced from the lower end thereof. The upper end of the vertical portion of the second member is then welded to the first member at the juncture of the vertical and inclined portions thereof, and the inner end of the horizontal portion of the second member is welded to the inclined portion of the first member at the point of contact therewith.

The triangular end plates or heads are then welded to opposite ends of the partly completed device, at the edge portions thereof, and each end plate is then internally welded to the underside of the horizontal portion of the second member.

The third member is then placed in position with the inner end of the horizontal portion thereof contacting the outer end of the horizontal portion of the first member, and with the upper end of the vertical portion thereof contacting the juncture of the vertical and horizontal portions of the second member, and is welded at these points of contact. The lower portions of the triangular end plates or heads are then edge welded to the ends of the third member and to the remaining lower portion of the first member, forming a hollow skewback channel with water-tight cooling chamber therein. Suitable water inlets and outlets are provided for each chamber.

Having thus briefly described the nature of the invention and the objects thereof, reference is now made to the drawings showing a preferred embodiment of the invention, in which:

Fig. 1 is a vertical, transverse sectional view through a fabricated water-cooled steel skewback channel embodying the invention, showing the same mounted upon the top of a furnace side wall and supporting one end of the roof arch of the furnace;

Fig. 2 is an elevation of the back or outer side of the skewback channel; and

Fig. 3 is a fragmentary sectional view showing a modification.

Referring now more particularly to the construction illustrated in the drawings, in which similar numerals refer to similar parts throughout, a portion of a side wall of an open hearth furnace or the like is shown at 10, and the adjacent end portion of the roof arch of the furnace is indicated at 11, in Fig. 1.

The fabricated, water-cooled, steel skewback channel to which the invention pertains, is indicated generally at 12, and is shown in Fig. 1 as mounted upon the top of the side wall 10 of the furnace in position to support the adjacent end of the roof arch 11. Conventional buck-stays 13 may be attached to the outer sides of the furnace side wall and the skewback channel in conventional manner.

The skewback channel is shown as formed of a plurality of steel plate members welded together to provide a hollow, watertight structure. As shown, the skewback channel may be formed of three formed plate members indicated generally at 14, 15 and 16, with triangular end plates or heads 17 welded to opposite ends thereof.

The member 14 is formed from a single steel plate and comprises the upper vertical portion 18 with the horizontal inwardly disposed corrugation 18a thereon. An inturned horizontal flange 19 is located at the upper end of the member 14, and the downwardly and inwardly inclined portion 20 is located below the vertical portion 18, and the out-turned, relatively short, horizontal flange 21 is located at the lower end thereof.

The member 15 is of L-shape and comprises the vertical portion 22 and the inturned horizontal portion 23 at the lower end thereof. An inwardly disposed horizontal corrugation 22a is formed in the vertical portion 22 of the member 15 and is coextensive therewith.

As shown in the drawings, the member 15 is located relative to the member 14, so that the vertical portion 22 thereof is in alignment with the vertical portion 18, and the upper edge of the vertical portion 22 is welded to the member 14 at the junctures of the vertical portion 18 and inclined portion 20 thereof, as indicated at 24.

The corrugations 18a and 22a thus formed in the back or web section of the skewback channel are for the purpose of reinforcing and strengthening the same against "sway-backing" from the combined load of the roof and temperature of the furnace.

As the member 15 is of considerably less height than the member 14, the horizontal portion 23 thereof is located some distance above the inturned horizontal flange 21, and the inner edge of the horizontal portion 23 is welded to the inclined portion 20 of the member 14, at a point spaced from the lower end thereof, as indicated at 25.

The third member 16 is of reclining L-shape and comprises the horizontal portion 26 and the relatively short vertical flange 27 at the outer edge thereof. The opposed edges of the horizontal portion 26 and the out-turned flange 21 are beveled, as indicated at 28 so as to form a pocket for the weld material 29 when these parts are butted together, as best shown in Fig. 1.

The vertical flange 27 of the member 16 is located in alignment with the vertical portions 18 and 22 of the members 14 and 15 respectively, and the upper edge of the flange 27 is welded to the member 15 at the junctures of the portions 22 and 23, as indicated at 30.

When the end plates or heads 17 are attached to opposite ends of the device, it will be seen that two separate water chambers are formed within the same, namely the upper chamber 31, which is triangular in cross section and the lower chamber 32, which is substantially rectangular in cross section.

For the purpose of circulating cooling water through these chambers, inlets and outlets are provided for each chamber. As shown in the drawings, an inlet 33 is provided in one end portion of the vertical flange 27 and an outlet 34 in the other end portion thereof, for circulating cooling water through the lower chamber 32.

In like manner, inlets 35 are provided at opposite ends near the lower edge of the vertical portion 22, and outlets 36 at opposite ends near the upper edges thereof for circulating cooling water through the upper chamber 31.

In assembling the several parts to form the hollow water-cooled skewback channel, the L-shape member 15 is first attached to the member 14 by locating the vertical portion 22 of the member 15 in vertical alignment with the vertical portion 18 of the member 14, and welding the upper edge of the portion 22 to the juncture of the vertical portion 18 and inclined portion 20 of the member 14, as indicated at 24, and by welding the inner edge of the horizontal portion 23 of the member 15 to the inclined portion 20 of the member 14, at a point spaced above the lower end thereof, as indicated at 25.

The triangular end plates or heads 17 may then be connected to opposite ends of the partly completed structure in the same manner illustrated and described in detail in said copending application, Serial No. 681,725. This operation may be briefly described as welding the exterior edges of the triangular end plates 17 to the exterior edges of the portions 20 and 22 of the members 14 and 15 respectively, such as shown at 37. The interior surface of each triangular plate 17 is then welded to the lower side of the adjacent end of the horizontal portion 23 of the member 15, as shown at 38.

The member 16 is then placed in position and welded to the members 14 and 15, by the welds 29 and 30, as above described, after which the remainder of the exterior edges of the triangular end plates 17 may be welded to the edge portions of the member 16, as indicated at 39.

With this construction the several parts may be easily welded together to form a water-tight structure having upper and lower chambers through which cooling water may be circulated, and in which the web section or outer vertical wall formed by the vertical portions 18 and 22 is strengthened and reforced against "sway-backing" from the combined load of the roof and temperature of the furnace, by the spaced horizontal corrugations therein.

Although the corrugations 18a and 22a are shown as angular in Figs. 1 and 2, it should be understood that these corrugations may be square as indicated at 18b in Fig. 3, rectangular or other shape of corrugation for added strength to the skewback channel.

In the foregoing description, certain terms have been used for brevity, clearness and understanding, but no unnecessary limitations are to be implied therefrom beyond the requirements of the prior art, because such words are used for descriptive purposes therein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A water-cooled skewback channel for mounting upon a furnace side wall to support the furnace roof, said skewback channel comprising a metal plate having an inwardly disposed horizontal flange at its upper end, said plate being then disposed vertically downward from said flange and then being bent inwardly and again outwardly to form an inwardly disposed corrugation, and then disposed downwardly and inwardly and then horizontally outward and terminating in an upwardly disposed vertical portion located in the plane of said downwardly disposed vertical portion, a second plate having a horizontal forwardly disposed portion connected to the downwardly and inwardly disposed portion of the first named plate and to the upper end of the upwardly disposed vertical portion thereof, and then being disposed vertically upward in the plane of the vertical portions of the first named plate and connected at its upper end to said first named plate, the intermediate portion thereof being bent inwardly and then outwardly forming an inwardly disposed corrugation, end walls connected to opposite ends of said plates and forming an elongated hollow shell of triangular cross section with a horizontal partition dividing said shell into two chambers, and means for circulating a cooling fluid through each chamber.

2. A water-cooled skewback channel for mounting upon a furnace side wall to support the furnace roof, said skewback channel comprising a metal plate having an inwardly disposed horizontal flange at its upper end, said plate being then disposed vertically downward from said flange and then being bent inwardly and again outwardly to form an inwardly disposed V-shaped corrugation, and then disposed downwardly and inwardly and then horizontally outward and terminating in an upwardly disposed vertical portion located in the plane of said downwardly disposed vertical portion, a second plate having a horizontal forwardly disposed portion connected to the downwardly and inwardly disposed portion of the first named plate and to the upper end of the upwardly disposed vertical portion thereof, and then being disposed vertically upward in the plane of the vertical portions of the first named plate and connected at its upper end to said first named plate, the intermediate portion thereof being bent inwardly and then outwardly forming an inwardly disposed V-shaped corrugation, end walls connected to opposite ends of said plates and forming an elongated hollow shell of triangular cross section with a horizontal partition dividing said shell into two chambers, and means for circulating a cooling fluid through each chamber.

3. A water-cooled skewback channel for mounting upon a furnace side wall to support the furnace roof, said skewback channel comprising a metal plate having an inwardly disposed horizontal flange at its upper end, said plate being then disposed vertically downward from said flange and then bent inwardly and then downwardly and again outwardly to form an inwardly disposed square corrugation, and then disposed downwardly and inwardly and then horizontally outward and terminating in an upwardly disposed vertical portion located in the plane of said downwardly disposed vertical portion, a second plate having a horizontal forwardly disposed portion connected to the downwardly and inwardly disposed portion of the first named plate and to the upper end of the upwardly disposed vertical portion thereof, and then being disposed vertically upward in the plane of the vertical portions of the first named plate and connected at its upper end to said first named plate, the intermediate portion thereof being bent inwardly and then upwardly and then outwardly forming an inwardly disposed square corrugation, end walls connected to opposite ends of said plates and forming an elongated hollow shell of triangular cross section with a horizontal partition dividing said shell into two chambers, and means for circulating a cooling fluid through each chamber.

References Cited in the file of this patent

UNITED STATES PATENTS

| | | |
|---|---|---|
| 2,299,102 | McLimans | Oct. 20, 1942 |
| 2,321,074 | Fon Dersmith et al. | June 8, 1943 |